(12) United States Patent
Huizen et al.

(10) Patent No.: US 11,912,201 B2
(45) Date of Patent: Feb. 27, 2024

(54) VEHICULAR EXTERIOR REARVIEW MIRROR ASSEMBLY WITH DUAL MODE ILLUMINATION MODULE

(71) Applicant: Magna Mirrors of America, Inc., Holland, MI (US)

(72) Inventors: Gregory A. Huizen, Hudsonville, MI (US); Eric Peterson, West Olive, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 291 days.

(21) Appl. No.: 17/453,900

(22) Filed: Nov. 8, 2021

(65) Prior Publication Data

US 2022/0063484 A1 Mar. 3, 2022

Related U.S. Application Data (63) Continuation of application No. 16/654,043, filed on Oct. 16, 2019, now Pat. No. 11,167,688.
(Continued)

(51) Int. Cl.
*B60Q 1/32* (2006.01)
*B60Q 1/00* (2006.01)
(Continued)

(52) U.S. Cl.
CPC ............ *B60R 1/1207* (2013.01); *B60Q 1/247* (2022.05); *B60Q 1/2665* (2013.01); *B60Q 1/2696* (2013.01); *B60Q 1/32* (2013.01); *B60R 1/25* (2022.01); *B60R 1/30* (2022.01); *B60R 11/04* (2013.01); *H04N 23/54* (2023.01);
(Continued)

(58) Field of Classification Search
CPC .... B60Q 1/247; B60Q 1/2665; B60Q 1/2669; B60Q 1/2696; B60Q 1/32; B60Q 2400/40; B60Q 1/00; B60Q 3/00; B60Q 2200/00; B60Q 2400/00; B60R 1/1207; B60R 1/25; B60R 1/30; B60R 11/04; B60R 2011/004; B60R 2300/806; B60R 1/00; B60R 3/00;
(Continued)

(56) References Cited

U.S. PATENT DOCUMENTS

5,371,659 A 12/1994 Pastrick et al.
5,497,305 A 3/1996 Pastrick et al.
(Continued)

*Primary Examiner* — Daquan Zhao
(74) *Attorney, Agent, or Firm* — HONIGMAN LLP (57) ABSTRACT

A vehicular exterior rearview mirror assembly includes a dual mode illumination module having a first light emitting diode (LED) operable to emit visible white light when electrically powered and a second LED operable to emit non-visible light when electrically powered. The first LED, when the vehicle is parked and the first LED is electrically powered, emits visible white light to provide visible ground illumination at a ground region at least partially along the side portion of the vehicle. Visible ground illumination by the vehicular exterior rearview mirror assembly at the ground region is locked-out during movement of the vehicle. The second LED, when the second LED is electrically powered, emits non-visible light to provide non-visible illumination for a camera viewing exterior and at least sideward of the vehicle. Non-visible light emission by the second LED is not locked-out during movement of the vehicle.

44 Claims, 5 Drawing Sheets

Related U.S. Application Data (60) Provisional application No. 62/746,627, filed on Oct. 17, 2018.

(51) Int. Cl.

| | | |
|---|---|---|
| *B60Q 3/00* | (2017.01) | |
| *B60R 1/25* | (2022.01) | |
| *B60R 1/30* | (2022.01) | |
| *B60R 11/04* | (2006.01) | |
| *B60R 1/12* | (2006.01) | |
| *B60Q 1/26* | (2006.01) | |
| *H04N 23/54* | (2023.01) | |
| *H04N 23/56* | (2023.01) | |
| *B60Q 1/24* | (2006.01) | |
| *B60R 1/00* | (2022.01) | |
| *B60R 11/00* | (2006.01) | |

(52) U.S. Cl.
CPC ......... *H04N 23/56* (2023.01); *B60Q 2400/40* (2013.01); *B60R 2011/004* (2013.01); *B60R 2300/806* (2013.01)

(58) Field of Classification Search
CPC ........ B60R 11/00; H04N 23/54; H04N 23/56; H04N 23/00
USPC ............ 348/61, 68, 118, 120, 131, 142
See application file for complete search history.

(56) References Cited

U.S. PATENT DOCUMENTS

| | | | |
|---|---|---|---|
| 5,497,306 | A | 3/1996 | Pastrick |
| 5,669,699 | A | 9/1997 | Pastrick et al. |
| 5,786,772 | A | 7/1998 | Schofield et al. |
| 5,823,654 | A | 10/1998 | Pastrick et al. |
| 5,929,786 | A | 7/1999 | Schofield et al. |
| 6,176,602 | B1 | 1/2001 | Pastrick et al. |
| 6,198,409 | B1 | 3/2001 | Schofield et al. |
| 6,227,689 | B1 | 5/2001 | Miller |
| 6,276,821 | B1 | 8/2001 | Pastrick et al. |
| 6,349,450 | B1 | 2/2002 | Koops et al. |
| 6,550,103 | B2 | 4/2003 | Koops et al. |
| 6,582,109 | B2 | 6/2003 | Miller |
| 6,690,268 | B2 | 2/2004 | Schofield et al. |
| 7,195,381 | B2 | 3/2007 | Lynam et al. |
| 7,492,281 | B2 | 2/2009 | Lynam et al. |
| 7,581,859 | B2 | 9/2009 | Lynam |
| 7,619,680 | B1 | 11/2009 | Bingle et al. |
| 7,626,749 | B2 | 12/2009 | Baur et al. |
| 7,944,371 | B2 | 5/2011 | Foote et al. |
| 8,058,977 | B2 | 11/2011 | Lynam |
| 8,786,704 | B2 | 7/2014 | Foote et al. |
| 8,801,245 | B2 | 8/2014 | De Wind et al. |
| 9,041,806 | B2 | 5/2015 | Baur et al. |
| 9,126,525 | B2 | 9/2015 | Lynam et al. |
| 9,596,387 | B2 | 3/2017 | Achenbach et al. |
| 9,762,880 | B2 | 9/2017 | Pflug |
| 9,834,153 | B2 | 12/2017 | Gupta et al. |
| 9,845,052 | B2 | 12/2017 | Wagner et al. |
| 9,900,522 | B2 | 2/2018 | Lu |
| 10,071,687 | B2 | 9/2018 | Ihlenburg et al. |
| 10,137,825 | B1 | 11/2018 | Salter et al. |
| 10,744,930 | B2 | 8/2020 | Sobecki et al. |
| 11,167,688 | B2 | 11/2021 | Huizen et al. |
| 2002/0005999 | A1 | 1/2002 | Hutzel et al. |
| 2003/0214733 | A1 | 11/2003 | Fujikawa et al. |
| 2005/0243172 | A1 | 11/2005 | Takano et al. |
| 2006/0018513 | A1* | 1/2006 | Sogawa ............... G01S 11/12 382/106 |
| 2007/0290823 | A1 | 12/2007 | Watanabe et al. |
| 2011/0074958 | A1 | 3/2011 | Pastrick et al. |
| 2012/0081915 | A1 | 4/2012 | Foote et al. |
| 2012/0162427 | A1 | 6/2012 | Lynam |
| 2012/0229645 | A1* | 9/2012 | Yamada ................ B60R 1/00 362/543 |
| 2013/0051040 | A1 | 2/2013 | Kracker et al. |
| 2013/0130674 | A1* | 5/2013 | De Wind ............ B60Q 1/2669 362/546 |
| 2014/0218212 | A1* | 8/2014 | Nykerk ................. B60Q 1/247 340/901 |
| 2015/0022664 | A1 | 1/2015 | Pflug et al. |
| 2015/0224919 | A1* | 8/2015 | Sobecki ................ B60Q 3/20 29/407.01 |
| 2017/0237945 | A1 | 8/2017 | Murar et al. |
| 2019/0106051 | A1* | 4/2019 | Huizen ................... F21S 43/26 |
| 2019/0324362 | A1* | 10/2019 | Favero .................. B60Q 1/263 |
| 2020/0377008 | A1* | 12/2020 | Sobecki .............. G02B 19/0066 |
| 2022/0258671 | A1* | 8/2022 | Huizen .................... F21S 43/40 |

\* cited by examiner

VEHICULAR EXTERIOR REARVIEW MIRROR ASSEMBLY WITH DUAL MODE ILLUMINATION MODULE

CROSS REFERENCE TO RELATED APPLICATIONS

The present application is a continuation of U.S. patent application Ser. No. 16/654,043, filed Oct. 16, 2019, now U.S. Pat. No. 11,167,688, which claims the filing benefits of U.S. provisional application Ser. No. 62/746,627, filed Oct. 17, 2018, which is hereby incorporated herein by reference in its entirety.

FIELD OF THE INVENTION

The present invention relates to illumination modules for vehicles and, more particularly, to a ground illumination module that provides visible illumination at the ground at or near the vehicle.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior mirror assembly, or a side door handle, or a rear portion of the vehicle, for providing illumination at the side or door or rear of the vehicle. The illumination module comprises a dual mode ground illuminator that provides visible light ground illumination for a person approaching the vehicle when the vehicle is parked or not moving (such as responsive to detection of approach of a person, such as via detection of a signal from a key fob or smart phone or remote transmitter or the like), and that provides infrared (IR) or near infrared (NIR) ground illumination (that is non-visible or non-discernible to the human eye) to improve night-time camera-captured image data for human interface and driving assist systems of the vehicle, such as parking assist and/or surround view image display and/or the like (and such as responsive to operation of the camera, such as via receipt of a signal indicative of the camera being operated to capture image data and optionally of the camera's frame rate of capture so the near infrared or infrared illumination can be synchronized with the camera).

These and other objects, advantages, purposes and features of the present invention will become apparent upon review of the following specification in conjunction with the drawings.

DESCRIPTION OF THE PREFERRED EMBODIMENTS

Figure 1:
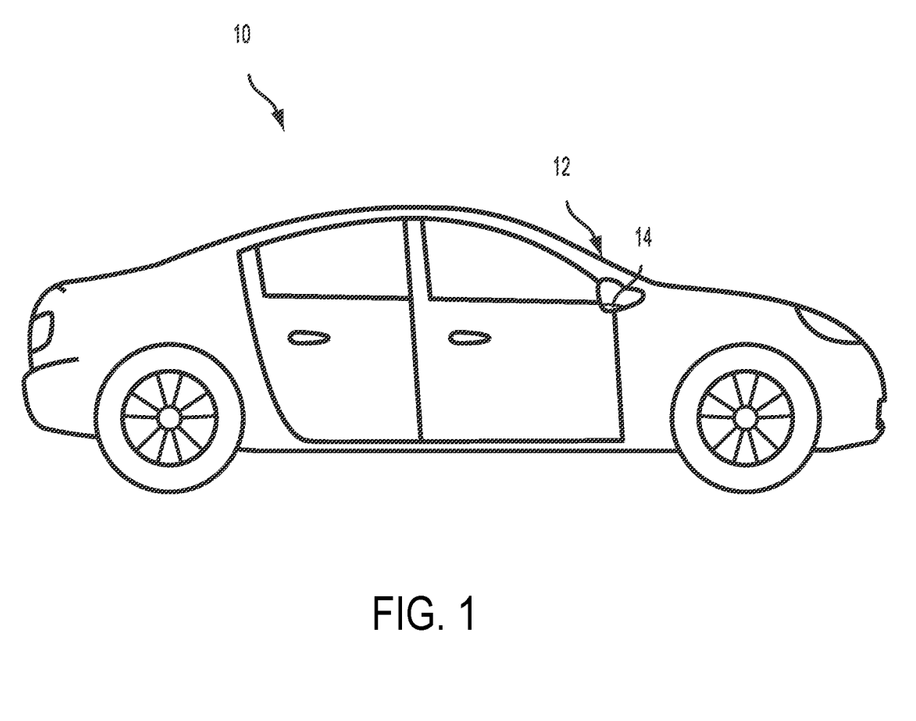
FIG. 1 is a side view of a vehicle with an illumination module at the exterior rearview mirror of the vehicle in accordance with the present invention.

Referring now to the drawings and the illustrative embodiments depicted therein, an illumination module 14 may be disposed at a vehicle exterior rearview mirror assembly 12 or the like at a side and exterior portion of a vehicle 10, with the illumination module 14 providing (a) visible ground illumination at the side of the vehicle and (b) infrared or near-infrared illumination at the side of the vehicle. Illumination module 14 includes a housing or casing that is configured to be received (and optionally snapped or otherwise secured) at or in an opening of the mirror assembly (or elsewhere at the vehicle, such as at a door handle assembly or underbody of the vehicle such as below a driver or passenger side door or the like), with an outer portion or cover being at or generally flush with the outer surface of the mirror assembly or door handle or vehicle body portion at which the illumination module is mounted. The illumination module may utilize aspects of the illumination modules described in U.S. Pat. No. 8,801,245 and/or U.S. Publication Nos. US-2019-0106051 and/or US-2015-0224919, and/or International Publication No. WO 2018/096523, which are all hereby incorporated herein by reference in its entirety.

Figure 2:
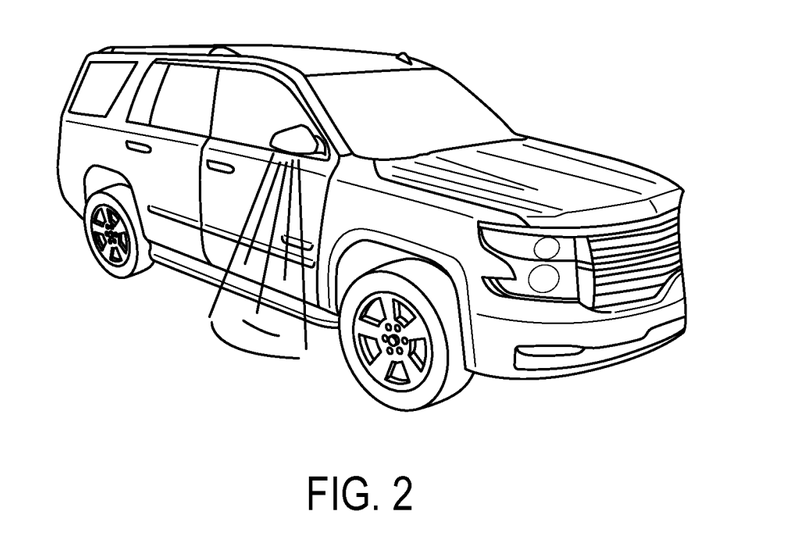
FIG. 2 is a perspective view showing the vehicle with the visible ground illuminator actuated to provide visible ground illumination at the side of the vehicle.

The dual mode ground illuminator or illumination module 14 thus provides a visible light ground illuminator for illuminating the ground at and along a side region of the vehicle, such as responsive to approach of a person carrying a key fob or passive entry device for the vehicle. For example, the visible ground illuminator may be actuated responsive to actuation of a door unlock button of a key fob or detection of proximity of a passive entry device (such as responsive to a signal received from a remote transmitter or key fob or passive entry device or smart phone), to provide visible light at the side of the vehicle (such as shown in FIG. 2).

Figure 3:
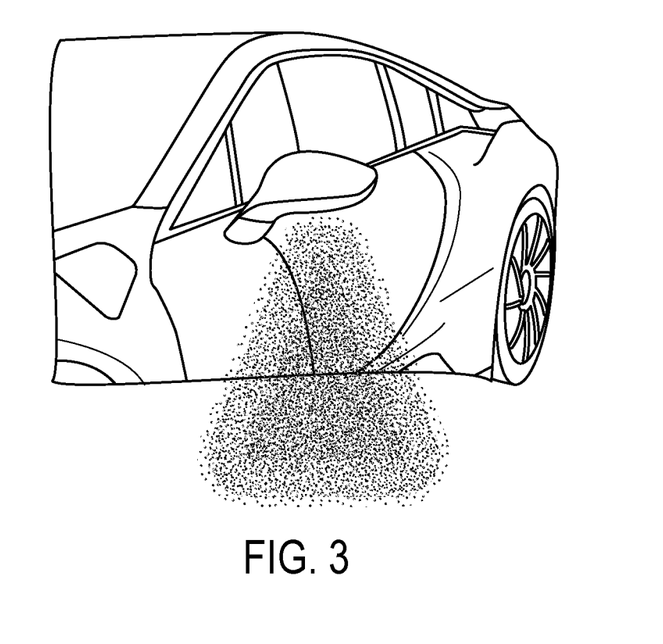
FIG. 3 is a perspective view showing the vehicle with the non-visible ground illuminator actuated to provide infrared or near infrared illumination at the side of the vehicle.

The dual mode ground illuminator or illumination module 14 also provides a non-visible light (e.g., infrared or near-infrared radiation) ground illuminator for illuminating the ground (and any objects present in the field of illumination of the emitted non-visible light) at and along a side region of the vehicle with infrared or near-infrared light, such as responsive to operation of a camera at the side of the vehicle. For example, during a parking maneuver in nighttime or low ambient lighting conditions, the non-visible light illuminator may provide non-visible illumination in the field of view of the camera at the side of the vehicle (with the camera comprising an imaging sensor that is sensitive to near infrared and/or infrared illumination), whereby the camera captures image data for object detection and/or to provide side view images for display at a display in the vehicle that is viewable by the driver of the vehicle while making the parking maneuver. The side view images may be merged or stitched with images derived from part of a surround view image display of the vehicle. The IR illumination improves night-time camera image data capture for both human interface and driving assist system (ADAS) applications (such as, for example, a parking assist system, a reversing assist system, an object detection system, a pedestrian detection system and/or the like). Because the IR illumination is not visible to a person viewing the vehicle, the IR ground illuminator can be used while the vehicle is in motion without distracting other drivers (and is not locked-out during vehicle movement such as is the case with visible light emitting ground illumination devices).

Figure 4:
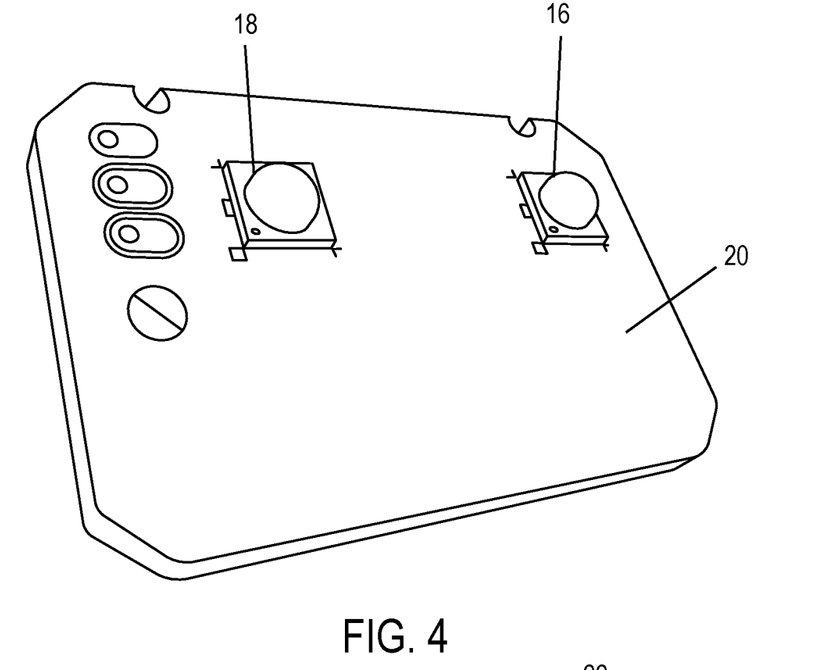
FIGS. 4 and 5 are perspective views of respective sides of a circuit board of the illumination module.
Figure 5:
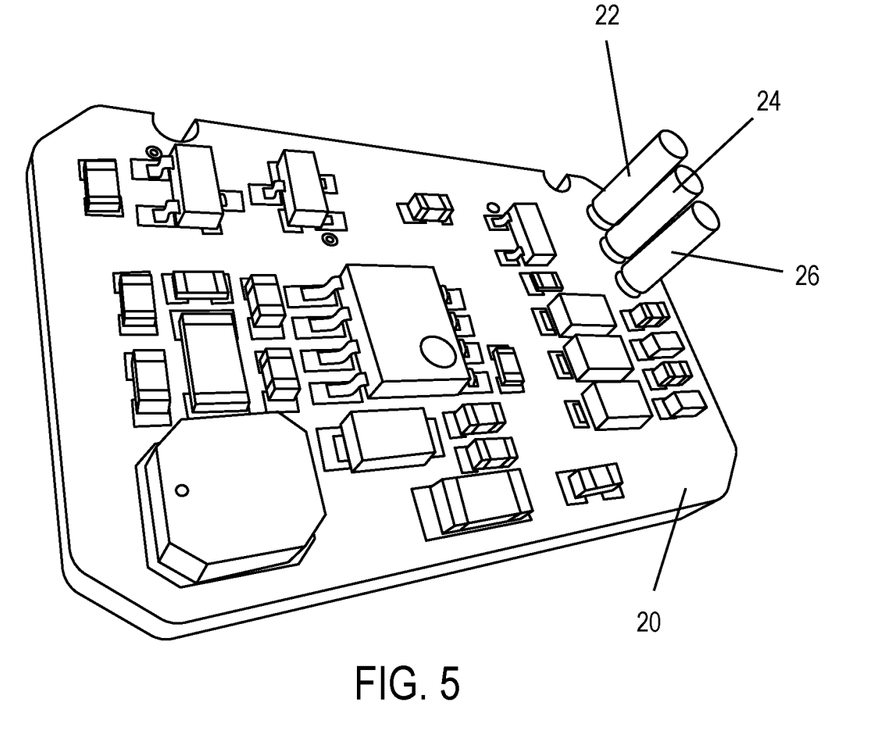

The dual mode ground illumination module 14 provides a single package with common driver components for both functions. As shown in FIGS. 4 and 5, a white light-emitting LED 16 and an infrared or near-infrared light-emitting LED 18 may both be disposed at a common or single circuit board 20 of the module. The electrical connections (ground 22, power for the visible light LED 24 and power for the IR LED 26) are provided at respective electrical connectors, whereby control of the light module may be provided from a central controller (or separate controllers) that energizes or electrically powers the visible light LED responsive to a key fob or passive entry device or smart phone (having an app that can send a signal to communicate with the vehicle or with an accessory of the vehicle) or the like, and that energizes or electrically powers the non-visible light LED responsive to a vision system or DAS or the like (such as responsive to actuation or operation of a camera at that location and optionally also responsive to an ambient light sensor, whereby the non-visible light LED is actuated when the camera is capturing image data and when the ambient light is below a threshold level). For example, the non-visible light LED may be actuated in low ambient light conditions such as are typically encountered during dusk and nighttime driving, where the ambient light present at the vehicle can be less than about 150 lux during urban driving conditions, less than about 75 lux during other driving conditions, and/or less than about 25 lux during unlit country-road driving conditions. Optionally, the dual mode ground illumination module 14 may include a control circuit or controller at the printed circuit board, whereby the controller may operate to independently energize and de-energize the LEDs responsive to signals indicative of operation of the camera and detection of a key fob or passive entry device or the like.

The dual mode ground illumination module 14 thus provides improved visibility and functional requirements for a surround view camera system. The dual mode ground illumination module also provides the ability to utilize surround view cameras for machine vision/ADAS in all lighting conditions.

The IR light concept can be utilized in several areas of the vehicle including the outside mirrors, interior, front headlamps, rear tail lights, etc. The electrical circuit (see FIG. 6) allows dual function of a single ground illuminator (GI) module. During user approach, the illumination module emits visible white light, and during low speed maneuvering (optionally only in low lighting conditions), the illumination module emits non-visible IR or NIR light.

Figure 6:
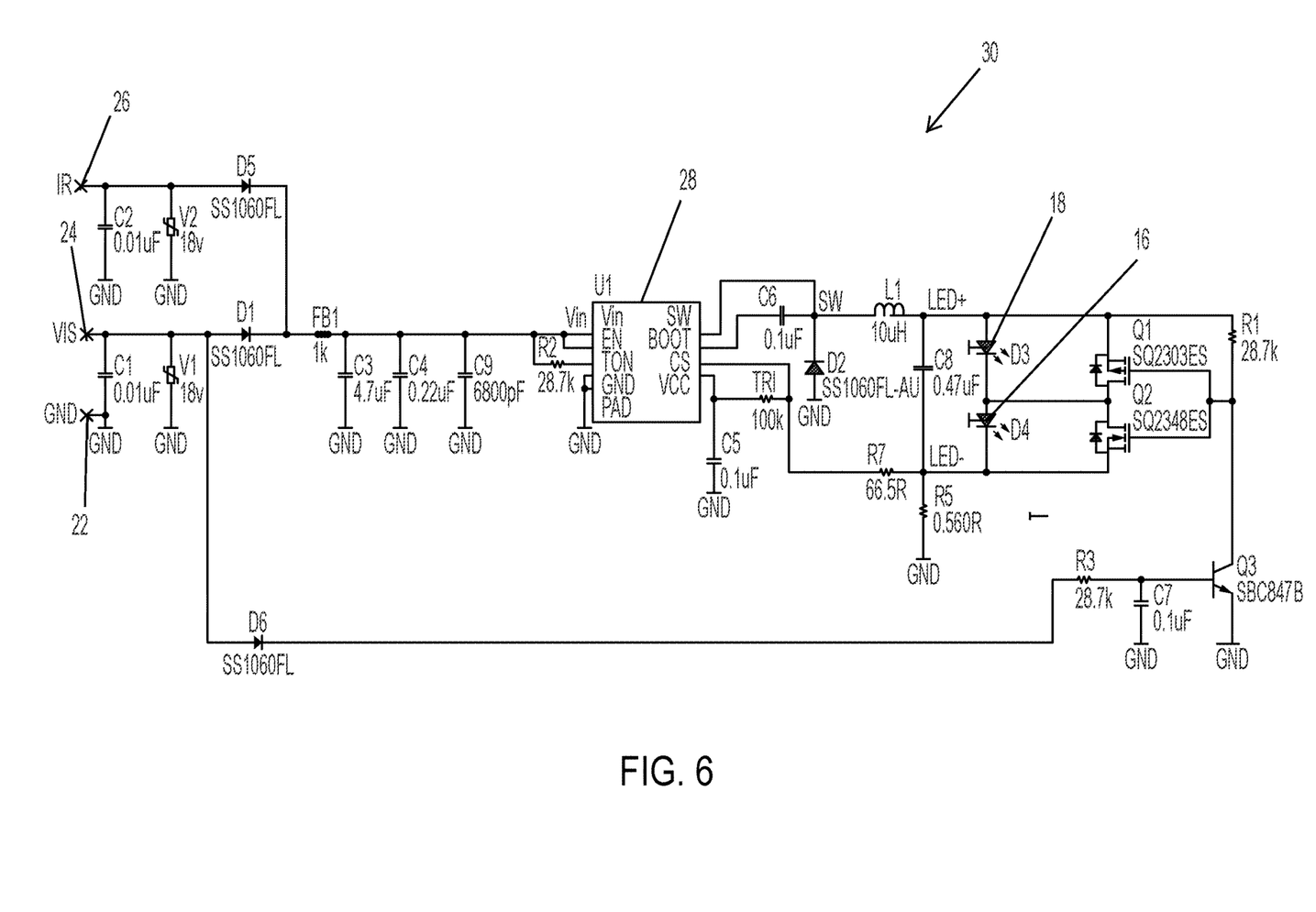
FIG. 6 is an electrical schematic of the circuit for the illumination module.

Referring now to FIG. 6, an exemplary schematic 30 of a circuit of the circuit board 20 is illustrated. The circuit includes an LED driver 28 for driving the white light LED 16 and the IR LED 18. The circuit may also a number of resistors, capacitors, inductors, diodes, and transistors to safely power and control the LEDs 16, 18. The circuit also includes ground 22, power for the white light LED 24, and power for the IR LED 26.

In some implementations, the dual mode ground illumination module 14 synchronizes either or both of the white LED and the IR LED to one or more imagers or image sensors of the camera. For example, an imager associated with the respective LED may control (i.e., enable and disable) the LED only when the imager is capturing light from the LED. As the imager does not need to capture light constantly and instead at a rate determined by the desired frame rate, phase/delay, and exposure time, intermittently and episodically enabling and disabling the LED may save a considerable amount of power and significantly reduce thermal load. For example, 30 W of illumination may be reduced to under 1 W average thermal power dissipation.

The IR LED may be episodically energized and synchronized with the camera capture rate so that the IR radiation provides enhanced imaging in low ambient lighting conditions (with the imager of the camera being sensitive to infrared or near-infrared illumination). Optionally, the dual mode ground illumination module may include a separate imager for the white light LED and the IR LED and each imager may control each LED respectively. Alternatively, a single imager may individually control each LED so as to capture light from either or both the white light LED and the IR LED.

Figure 7:
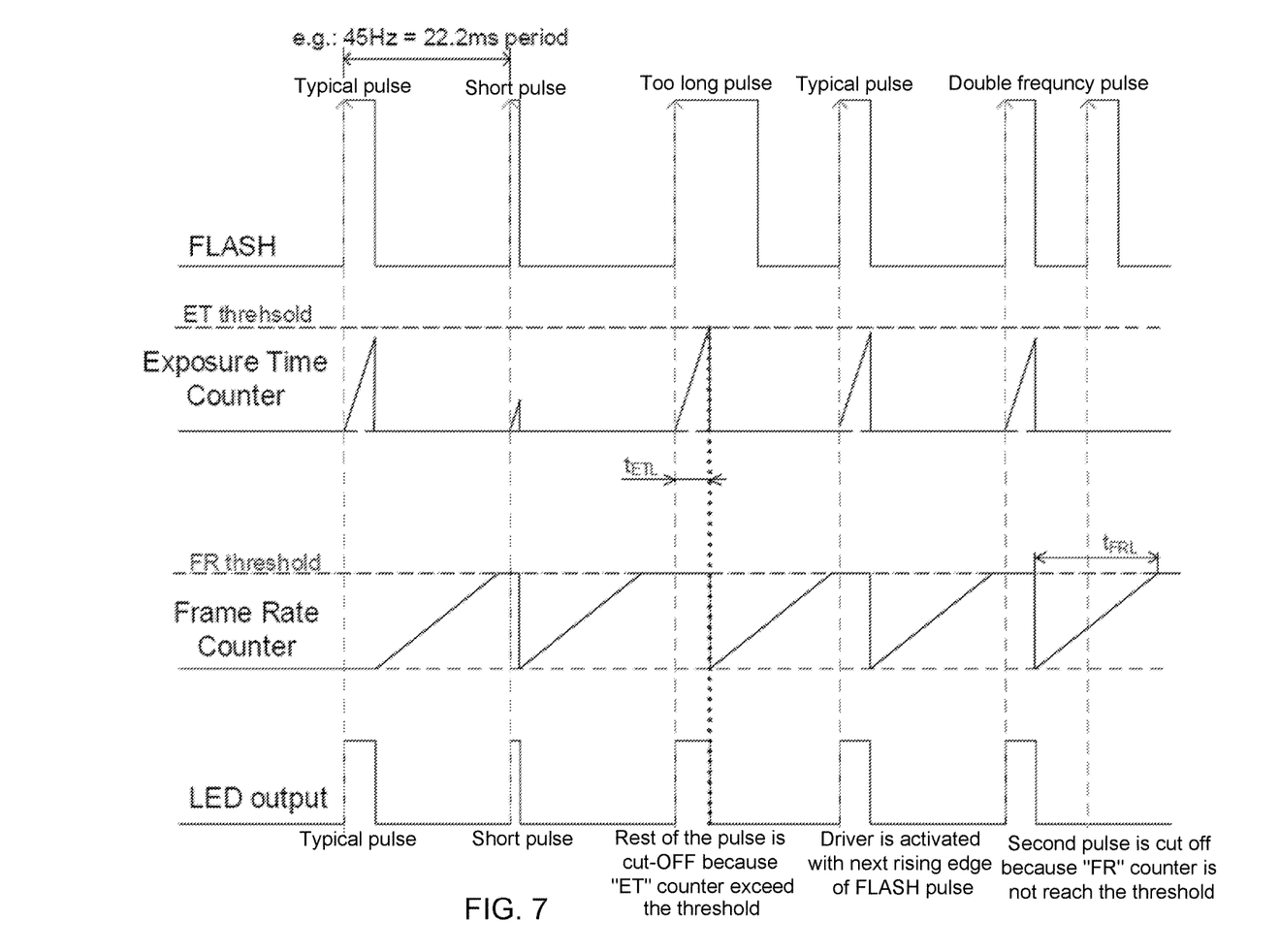
FIG. 7 is a graph showing the LED output as controlled by a FLASH signal, an exposure time counter and a frame rate counter.

Referring now to FIG. 7, the LED output (such as the IR LED when synchronized to the camera capture rate) may be controlled by a FLASH signal, an exposure time counter and a frame rate counter. For example, the imager(s) may enable the LED output when the FLASH signal is asserted, the exposure time counter is below an exposure timer threshold, and the frame rate counter is below a frame rate threshold. The exposure time counter may begin counting on the rising edge of the FLASH signal and reset with the falling edge of the FLASH signal. The frame rate counter may reset and begin counting at each falling edge of the FLASH signal.

As shown in FIG. 7, the typical FLASH pulse may be at 45 Hz (providing a 22.2 ms period). When the FLASH pulse is too long, the exposure time counter is cut off when the exposure time counter exceeds an exposure time threshold counter value. Similarly, the frame rate counter is cut off when the frame rate counter reaches a frame rate threshold value. In situations where the FLASH signal outputs a double frequency pulse, the LED output may not generate a second pulse because the second pulse may be cut off if the frame rate counter does not reach the frame rate counter threshold value.

The dual mode ground illuminator or illumination module may be disposed at a side portion of the vehicle, such as at or in an exterior sideview mirror assembly (or side door handle), to provide ground illumination (visible and/or infrared) at the side ground region. Optionally, the dual mode ground illuminator or illumination module may be disposed at a rear portion of the vehicle, such as the rear door or liftgate or trunk or decklid to provide ground illumination (visible and/or infrared) at the rear ground region rearward of the vehicle, whereby the infrared illumination is provided during a reversing maneuver at night to provide enhanced rear vision via a rear backup camera of the vehicle. Optionally, the dual mode ground illuminator or illumination module may be disposed at a front portion of the vehicle, such as at or in or part of the vehicle headlamps or at the front bumper or grille of the vehicle, to provide ground illumination (visible and/or infrared) at the front ground region forward of the vehicle.

Although shown and described as being disposed at an exterior rearview mirror assembly and/or door handle and/or exterior portion of a vehicle for providing illumination at a side of a vehicle, it is envisioned that the dual mode illumination module of the present invention is suitable for other applications. For example, a dual mode illumination module of the present invention may be disposed at an interior portion of a vehicle, such as at an interior rearview mirror assembly (such as at a mirror casing or behind a reflective element and viewable through the reflective element or the like) of the vehicle or the like, whereby actuation of the visible light illuminator may provide broad illumination of the dashboard and/or instrument panel of the vehicle (generally beneath the mirror assembly), and actuation of the non-visible light illuminator may provide non-visible or IR illumination in the vehicle cabin, such as for a driver monitor system or a baby monitor system or the like.

The dual mode illumination module comprises a unitary module that may be plugged in or installed or attached at an opening at a vehicle (such as an opening at a door handle or exterior rearview mirror or trim element or the like) and may comprise a substantially water impervious sealed module (optionally, with the outer cover comprising a unitary construction and including the lens and an outer portion for sealing at and around the housing. An electrical lead is electrically connected to circuitry at the circuit element or board and may include terminals extending through and from a rear portion or wall or potting of the casing or housing for electrically connecting the illumination module to a power source and/or control of the vehicle and/or door and/or exterior rearview mirror assembly and/or the like.

Thus, the vehicular illumination module is configured for mounting at an exterior portion of a vehicle and includes a housing, which accommodates a printed circuit board (PCB), and first and second light emitting diodes (LEDs) disposed at the PCB. The first LED is operable to emit visible white light when electrically powered, and is electrically powered responsive at least in part to actuation of a key fob or detection of a passive entry device. The second LED is operable to emit near-infrared light when electrically powered, and is electrically powered responsive at least in part to operation of a camera disposed at or near the exterior portion of the vehicle and having a field of view exterior of the vehicle. The first LED, when electrically powered responsive to actuation of a key fob or detection of a passive entry device, emits visible white light to provide visible ground illumination at the ground near the exterior portion of the vehicle, such as for a security lighting or welcome lighting or the like as a person is detected or determined to be at or approaching the vehicle. The second LED, when electrically powered responsive to operation of the camera, emits near-infrared light to provide non-visible illumination in the field of view of the camera, so that the camera captures image data representative of the illuminated field of view at the side region at or near the vehicle. The first LED provides ground illumination at the ground region at and at least partially along the side or rear of the vehicle (where the module is mounted), while the second LED has its illumination field (the region that the emitted near-infrared light illuminates) within or at least partially overlapping the field of view of the camera, so that the camera has enhanced image capture at low ambient light conditions.

The second LED may be actuated responsive at least in part to an ambient light sensor of the vehicle. For example, when the ambient light sensor (at the module or at the side or rear of the vehicle or elsewhere at the vehicle) determines that the ambient light level incident thereat is below a threshold value, the second or near-infrared light emitting LED may be actuated to provide enhanced illumination at and at least partially within the field of view of the camera by illuminating the region with near-infrared or non-visible light so that the camera (having an imager sensitive to the near-infrared light spectral range) can capture clearer and less dark images or image data, such as for use with or by a driving assist system of the vehicle. With the second LED electrically powered, the camera may capture image data while the vehicle is in motion, while the first LED is not electrically powered when the vehicle is in motion. For example, with the second LED electrically powered, the camera may capture image data during a parking maneuver of the vehicle, or may capture image data for a driving assist system of the vehicle, or may capture image data for a surround view display system of the vehicle.

The exterior portion of the vehicle at which the illumination module is mounted may comprise an exterior rearview mirror at a side of the vehicle (optionally, with an illumination module disposed at each side of the vehicle or at each exterior rearview mirror of the vehicle). Optionally, the exterior portion of the vehicle at which the illumination module is mounted may comprise an exterior side door handle of the vehicle. Optionally, the exterior portion of the vehicle at which the illumination module is mounted may comprise an exterior rear portion of the vehicle.

The first LED is not electrically powered when the second LED is electrically powered. In other words, only one of the LEDs is activated at any given time. In order to conserve power and reduce heat generated by the LEDs, the second LED may episodically powered responsive to operation of the camera so that the second LED is only powered when the imager is exposed and the camera is capturing image data, and the second LED is not powered when the camera is not capturing image data. For example, the camera may capture image data at a frame rate of at least 30 frames per second, and the second LED thus may be episodically powered at a pulse rate of at least 30 frames per second, with the pulses of the second LED being synchronized with the frame captures of the camera.

The first LED may be electrically powered responsive to an output of a controller that receives a wireless signal indicative of actuation of the key fob or detection of the passive entry device. For example, a door control module of the vehicle may generate a signal to the illumination device when the door control module determines that (or receives a signal indicative of) a key fob is actuated or a passive entry device is detected at or near the vehicle. The second LED may also be electrically powered responsive to an output of a controller that receives a signal indicative of operation of the camera. For example, a controller may operate responsive to a signal from a vision system controller of the vehicle, with the signal being indicative of operation of the camera and indicating the image capture frame rate. Optionally, the controller or controllers may be part of the illumination module and may be disposed at the printed circuit board.

Therefore, the dual mode illumination module provides a dual function and is operable to provide a ground illumination function (such as via one or more white light-emitting light emitting diodes or other suitable light source) and an IR or NIR illumination function (such as via one or more infrared light-emitting LEDs or other suitable light source). The illumination module comprises a self-contained unitary sealed module with two light emitting diodes and a lens/light guiding element to provide the desired illumination effect with the illumination source or illumination sources. Optionally, the illumination module may also provide a light projection function (such as projection of white or non-white light, such as a selected color or such as a variable color or the like to optionally coordinate with an interior color scheme of the vehicle or the like) with one (or more) light emitting diode (or other suitable light source). For example, the first or white light emitting LED may function to project an icon or logo or the like onto the ground region at or adjacent to the vehicle at the side or rear of the vehicle where the illumination module is mounted.

The vehicle may have a camera at each side and at the rear of the vehicle (and optionally at the front of the vehicle as well), and a dual mode illumination module may be disposed at each side and at the rear of the vehicle (and optionally at the front of the vehicle as well) to provide a security light or ground illumination function at the sides and rear of the vehicle (responsive to a keyless entry device or passive entry device or the like) and to provide IR or NIR illumination that encompasses at least a portion of the fields of view of the respective cameras at or near the respective illumination module. The illumination modules may be controlled together or individually. For example, the ground illumination feature may only be provided by an illumination module at the portion(s) of the vehicle where the person(s) is approaching, or all of the modules may be commonly powered or controlled to provide ground illumination at least partially around the vehicle responsive to the determined approach of the authorized or identified person. Also, for example, the IR or NIR illuminator may be powered at only the rear portion of the vehicle during a reversing maneuver, while the IR or NIR illuminator of all of the dual mode illumination modules may be activated during other driving maneuvers, such as parking maneuvers or the like.

The dual mode illumination module thus may comprise a small, self-contained module that includes a housing that substantially encases the illumination sources and circuitry of the illumination module. The housing and/or cover attached thereto includes an outer wall that substantially corresponds to the contours of the mirror assembly or door handle assembly at the illumination module such that the outer vehicle surface has a substantially continuous outer surface or wall at the illumination module. The module and housing may be substantially sealed so as to be substantially impervious to water, dirt, debris and the like, so that the module is well suited for the exterior application at the vehicle exterior rearview mirror or vehicle door handle.

The illumination sources may comprise any suitable illumination sources, such as one or more light emitting diodes (LEDs), such as white light-emitting LEDs or high intensity power LEDs (such as the types described in U.S. Pat. No. 7,195,381 and/or 6,690,268, which are hereby incorporated herein by reference in their entireties) and IR or NIR LEDs, or organic light emitting diodes (OLEDs) or electroluminescent light sources or the like. The visible light illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the vehicle side area depending on the particular application of the illumination module. For example, the illumination module may emit or transmit colored light that may match or correspond to the interior and/or exterior lighting of the particular vehicle to which the illumination module is mounted.

Optionally, the cover and/or housing may be overmolded over the illumination sources and circuitry to provide a substantially sealed and substantially water impervious illumination module. For example, the housing may be overmolded over and around a metal stamping or stamped circuit element or plate with the illumination sources (such as LEDs or the like) fastened thereto or otherwise established thereon, or the housing may be overmolded over and around a printed circuit board or element with the illumination sources established thereon.

Thus, the present invention provides a dual mode illumination module at an exterior portion (or optionally interior portion) of the vehicle. Optionally, the illumination device or module of the present invention may be operable as an indicator to provide the driver with feedback as the driver or user or operator uses his or her key fob or as the passive or keyless entry system (PKE system) of the vehicle operates. Optionally, the illumination device or module may display vehicle logos or the like, and may use variable color LEDs that could be linked to an interior lighting system of the vehicle, such as to a MYCOLOR™ interior lighting system of the vehicle or the like.

The vehicle camera or cameras may comprise any suitable camera or imaging device, and the vision system and/or driving assist system and/or display system may utilize aspects of the imaging systems described in U.S. Pat. Nos. 7,038,577; 6,882,287; 6,198,409; 5,929,786; 5,786,772; 7,881,496; 7,720,580; 6,353,392 and/or 6,313,454 (which are all hereby incorporated herein by reference in their entireties), and/or of reverse or backup aid systems, such as the rearward directed vehicle vision systems described in U.S. Pat. Nos. 5,550,677; 5,760,962; 5,670,935; 6,201,642; 6,396,397; 6,498,620; 6,717,610 6,757,109 and/or 7,005,974 (which are all hereby incorporated herein by reference in their entireties), which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,965,336; 6,097,023 and/or 5,796,094 (which are all hereby incorporated herein by reference in their entireties).

The vision system may include a display for displaying images captured by one or more cameras of the vehicle (such as sideward viewing cameras and/or a rearward viewing camera and/or a forward viewing camera) for viewing by the driver of the vehicle while the driver is normally operating the vehicle. Optionally, the video display device or system may utilize aspects of the devices and/or systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the camera or cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,126,525 and/or 9,041,806, and/or U.S. Publication Nos. US-2015-0022664 and/or US-2012-0162427, which are hereby incorporated herein by reference in their entireties.

Optionally, the illumination module and/or the exterior rearview mirror assembly of the vehicle may incorporate a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, said vehicular exterior rearview mirror assembly comprising:
    a dual mode illumination module;
    wherein said dual mode illumination module comprises a first light emitting diode (LED) operable to emit visible white light when electrically powered;
    wherein said dual mode illumination module comprises a second LED operable to emit non-visible light when electrically powered;
    wherein, with said vehicular exterior rearview mirror assembly mounted at a side portion of a vehicle, and when the vehicle is parked and said first LED is electrically powered, said first LED emits visible white light to provide visible ground illumination at a ground region at least partially along the side portion of the vehicle;
    wherein visible ground illumination by said vehicular exterior rearview mirror assembly at the ground region is locked-out during movement of the vehicle;
    wherein, with said vehicular exterior rearview mirror assembly mounted at the side portion of the vehicle, and when said second LED is electrically powered, said second LED emits non-visible light to provide non-visible illumination for a camera viewing exterior and at least sideward of the vehicle; and
    wherein non-visible light emission by said second LED is not locked-out during movement of the vehicle.

2. The vehicular exterior rearview mirror assembly of claim 1, wherein, with said vehicular exterior rearview mirror assembly mounted at the side portion of the vehicle, said first LED is electrically powered responsive at least in part to a user device.

3. The vehicular exterior rearview mirror assembly of claim 2, wherein the user device comprises a smart phone.

4. The vehicular exterior rearview mirror assembly of claim 2, wherein the user device comprises a passive entry device.

5. The vehicular exterior rearview mirror assembly of claim 1, wherein, with said vehicular exterior rearview mirror assembly mounted at the side portion of the vehicle, said second LED is actuated responsive at least in part to an ambient light sensor of the vehicle.

6. The vehicular exterior rearview mirror assembly of claim 1, wherein the camera captures image data when said second LED is electrically powered during movement of the vehicle.

7. The vehicular exterior rearview mirror assembly of claim 1, wherein the camera captures image data during a parking maneuver of the vehicle.

8. The vehicular exterior rearview mirror assembly of claim 1, wherein the camera captures image data for a driving assist system of the vehicle.

9. The vehicular exterior rearview mirror assembly of claim 1, wherein the camera captures image data for a surround view display system of the vehicle.

10. The vehicular exterior rearview mirror assembly of claim 1, wherein the camera captures image data for an object detection system of the vehicle.

11. The vehicular exterior rearview mirror assembly of claim 1, wherein said vehicular exterior rearview mirror assembly comprises the camera.

12. The vehicular exterior rearview mirror assembly of claim 1, wherein (i) said second LED is electrically powered when the camera captures image data and (ii) said second LED is not electrically powered when the camera is not capturing image data.

13. The vehicular exterior rearview mirror assembly of claim 12, wherein the camera captures image data at a frame rate of at least 30 frames per second, and wherein said second LED is pulsed to emit non-visible light at a pulse rate of at least 30 pulses per second, and wherein the pulses of said second LED are synchronized with frame captures of the camera.

14. The vehicular exterior rearview mirror assembly of claim 1, wherein said first LED is electrically powered responsive to an output of a controller of said dual mode illumination module, and wherein, with said vehicular exterior rearview mirror assembly mounted at the side portion of the vehicle, the controller generates the output responsive to proximity or approach of a user device.

15. The vehicular exterior rearview mirror assembly of claim 14, wherein said controller is disposed at a printed circuit board of said dual mode illumination module.

16. The vehicular exterior rearview mirror assembly of claim 1, wherein said second LED is electrically powered responsive to an output of a controller of said dual mode illumination module, and wherein, with said vehicular exterior rearview mirror assembly mounted at the side portion of the vehicle, the controller generates the output responsive to receiving a signal indicative of operation of the camera.

17. The vehicular exterior rearview mirror assembly of claim 16, wherein said controller is disposed at a printed circuit board of said dual mode illumination module.

18. The vehicular exterior rearview mirror assembly of claim 17, wherein said first LED is electrically powered responsive to another output of the controller, and wherein, with said vehicular exterior rearview mirror assembly mounted at the side portion of the vehicle, the controller generates the other output responsive to proximity or approach of a user device.

19. The vehicular exterior rearview mirror assembly of claim 1, wherein said dual mode illumination module comprises a housing.

20. The vehicular exterior rearview mirror assembly of claim 19, wherein an outer surface of said dual mode illumination module is flush with an outer surface of a casing of said vehicular exterior rearview mirror assembly.

21. The vehicular exterior rearview mirror assembly of claim 1, wherein said second LED emits near-infrared light when electrically powered.

22. A vehicular exterior rearview mirror assembly, said vehicular exterior rearview mirror assembly comprising:
    a camera;

wherein, with said vehicular exterior rearview mirror assembly mounted at a side portion of a vehicle, said camera views exterior and at least sideward of the vehicle;

a dual mode illumination module;

wherein said dual mode illumination module comprises a first light emitting diode (LED) operable to emit visible white light when electrically powered;

wherein said dual mode illumination module comprises a second LED operable to emit non-visible light when electrically powered;

wherein, with said vehicular exterior rearview mirror assembly mounted at the side portion of the vehicle, and when the vehicle is parked and said first LED is electrically powered, said first LED emits visible white light to provide visible ground illumination at a ground region at least partially along the side portion of the vehicle;

wherein, with said vehicular exterior rearview mirror assembly mounted at the side portion of the vehicle, said first LED is electrically powered responsive at least in part to a user device;

wherein visible ground illumination by said vehicular exterior rearview mirror assembly at the ground region is locked-out during movement of the vehicle;

wherein, with said vehicular exterior rearview mirror assembly mounted at the side portion of the vehicle, and when said second LED is electrically powered, said second LED emits non-visible light to provide non-visible illumination for said camera; and wherein non-visible light emission by said second LED is not locked-out during movement of the vehicle.

23. The vehicular exterior rearview mirror assembly of claim 22, wherein the user device comprises a smart phone.

24. The vehicular exterior rearview mirror assembly of claim 22, wherein the user device comprises a passive entry device.

25. The vehicular exterior rearview mirror assembly of claim 22, wherein said camera captures image data during a parking maneuver of the vehicle.

26. The vehicular exterior rearview mirror assembly of claim 22, wherein said camera captures image data for a driving assist system of the vehicle.

27. The vehicular exterior rearview mirror assembly of claim 22, wherein said camera captures image data for a surround view display system of the vehicle.

28. The vehicular exterior rearview mirror assembly of claim 22, wherein said camera captures image data for an object detection system of the vehicle.

29. The vehicular exterior rearview mirror assembly of claim 22, wherein (i) said second LED is electrically powered when said camera captures image data and (ii) said second LED is not electrically powered when said camera is not capturing image data.

30. The vehicular exterior rearview mirror assembly of claim 29, wherein said camera captures image data at a frame rate of at least 30 frames per second, and wherein said second LED is pulsed to emit non-visible light at a pulse rate of at least 30 pulses per second, and wherein the pulses of said second LED are synchronized with frame captures of said camera.

31. The vehicular exterior rearview mirror assembly of claim 22, wherein said dual mode illumination module comprises a housing.

32. The vehicular exterior rearview mirror assembly of claim 31, wherein an outer surface of said dual mode illumination module is flush with an outer surface of a casing of said vehicular exterior rearview mirror assembly.

33. The vehicular exterior rearview mirror assembly of claim 22, wherein said second LED emits near-infrared light when electrically powered.

34. A vehicular exterior rearview mirror assembly, said vehicular exterior rearview mirror assembly comprising:

a camera;

wherein, with said vehicular exterior rearview mirror assembly mounted at a side portion of a vehicle, said camera is disposed at a lower portion of said vehicular exterior rearview mirror assembly, relative to ground, and views exterior and at least sideward of the vehicle;

wherein, with said vehicular exterior rearview mirror assembly mounted at the side portion of the vehicle, said camera captures image data for a surround view display system of the vehicle;

a dual mode illumination module;

wherein said dual mode illumination module comprises a printed circuit board, and wherein said printed circuit board comprises a first light emitting diode (LED) and a second LED;

wherein said first LED is operable to emit visible white light when electrically powered;

wherein said second LED is operable to emit non-visible light when electrically powered;

wherein, with said vehicular exterior rearview mirror assembly mounted at the side portion of the vehicle, and when the vehicle is parked and said first LED is electrically powered, said first LED emits visible white light to provide visible ground illumination at a ground region at least partially along the side portion of the vehicle;

wherein visible ground illumination by said vehicular exterior rearview mirror assembly at the ground region is locked-out during movement of the vehicle;

wherein, with said vehicular exterior rearview mirror assembly mounted at the side portion of the vehicle, and when said second LED is electrically powered, said second LED emits non-visible light to provide non-visible illumination for said camera; and wherein non-visible light emission by said second LED is not locked-out during movement of the vehicle.

35. The vehicular exterior rearview mirror assembly of claim 34, wherein, with said vehicular exterior rearview mirror assembly mounted at the side portion of the vehicle, said first LED is electrically powered responsive at least in part to a user device.

36. The vehicular exterior rearview mirror assembly of claim 35, wherein the user device comprises a smart phone.

37. The vehicular exterior rearview mirror assembly of claim 35, wherein the user device comprises a passive entry device.

38. The vehicular exterior rearview mirror assembly of claim 34, wherein, with said vehicular exterior rearview mirror assembly mounted at the side portion of the vehicle, said second LED is actuated responsive at least in part to an ambient light sensor of the vehicle.

39. The vehicular exterior rearview mirror assembly of claim 34, wherein said camera captures image data during a parking maneuver of the vehicle.

40. The vehicular exterior rearview mirror assembly of claim 34, wherein (i) said second LED is electrically powered when said camera captures image data and (ii) said second LED is not electrically powered when said camera is not capturing image data.

41. The vehicular exterior rearview mirror assembly of claim 40, wherein said camera captures image data at a frame rate of at least 30 frames per second, and wherein said second LED is pulsed to emit non-visible light at a pulse rate of at least 30 pulses per second, and wherein the pulses of said second LED are synchronized with frame captures of said camera.

42. The vehicular exterior rearview mirror assembly of claim 34, wherein said dual mode illumination module comprises a housing.

43. The vehicular exterior rearview mirror assembly of claim 42, wherein an outer surface of said dual mode illumination module is flush with an outer surface of a casing of said vehicular exterior rearview mirror assembly.

44. The vehicular exterior rearview mirror assembly of claim 34, wherein said second LED emits near-infrared light when electrically powered.

\* \* \* \* \*